United States Patent [19]

Kochler et al.

[11] Patent Number: 6,085,082
[45] Date of Patent: Jul. 4, 2000

[54] DIGITAL SIGNAL RECEIVER WITH CHARGE METERING EQUIPMENT

[75] Inventors: Helmut Kochler, Wollerau; Christoph Von Burg, Richterswil; Christian Landert, Baar, all of Switzerland

[73] Assignee: Erika Kochler, Samstagern, Switzerland

[21] Appl. No.: 08/973,367

[22] PCT Filed: May 20, 1996

[86] PCT No.: PCT/IB96/00473

§ 371 Date: Jan. 19, 1999

§ 102(e) Date: Jan. 19, 1999

[87] PCT Pub. No.: WO97/00584

PCT Pub. Date: Jan. 3, 1997

[30] Foreign Application Priority Data

Jun. 15, 1995 [EP] European Pat. Off. ............. 95109283

[51] Int. Cl.[7] .................................................. H04M 11/00
[52] U.S. Cl. ......................... 455/407; 455/406; 455/405
[58] Field of Search .................................... 455/405, 406, 455/407, 408, 414; 379/114, 130

[56] References Cited

U.S. PATENT DOCUMENTS

| | | |
|---|---|---|
| 4,776,003 | 10/1988 | Harris ...................................... 455/407 |
| 5,109,401 | 4/1992 | Hattori et al. ........................... 455/407 |
| 5,353,335 | 10/1994 | D'Urso et al. ............................. 379/67 |
| 5,577,100 | 11/1996 | McGregor et al. ...................... 455/406 |
| 5,673,306 | 9/1997 | Amadon et al. ......................... 455/406 |
| 5,722,067 | 2/1998 | Fougnies et al. ........................ 455/406 |
| 5,826,185 | 10/1998 | Wise et al. ............................... 455/405 |
| 5,854,975 | 12/1998 | Fougnies et al. ........................ 455/408 |
| 5,915,214 | 6/1999 | Reece et al. ............................. 455/407 |

*Primary Examiner*—Daniel S. Hunter
*Assistant Examiner*—Thuan T. Nguyen
*Attorney, Agent, or Firm*—Ladas & Parry

[57] ABSTRACT

The receiver can e.g. be designed as a pager by means of which information subject to charge can be received. In a receiver control unit (2) the information to be processed and displayed is filtered. The information to be processed is selected by means of an input unit (5). For determining the charges of the selected information a charge counter 6 is arranged in the receiver. If these charges reach a certain limit, the selection of further information is disabled. If the limit is exceeded, the processing of information subject to charge is stopped. In this way the user can, within his credit limit, choose himself which information or services he wants to receive without having to contact the service provider or network operator. The credit limit can be modified upon demand.

12 Claims, 2 Drawing Sheets

DIGITAL SIGNAL RECEIVER WITH CHARGE METERING EQUIPMENT

FIELD OF THE INVENTION

The invention relates to a receiver for digital signals emitted by radio as well as to a method for operating such a device according to the preamble of the independent claims.

DISCUSSION OF RELATED ART

Devices of this kind are mainly known as pagers, but they can e.g. also be an integrated part of mobile phones. Usually, they are part of a radio paging net, such as it is e.g. described in EP-A-198 448 and serve for receiving messages or information of various type. For this purpose, they usually posses several calling addresses, which make possible the receipt of data of different providers or services. Thus, a pager can e.g. receive finance information at address and, at an other address, the road conditions or individual messages only directed to it. In practice, pagers nowadays possess up to 16 different addresses or more and accordingly can receive and process different service messages. When a pager owner wants to receive a new service, the calling number (address) of the service must be programmed into the pager. This can be carried out directly on the pager or by radio from the center. If the service is not free of charge, the additional costs must be charged to the user's subscription by the provider of the information or his representative. This leads, however, to considerable administrative and technical expense and has for the pager owner the disadvantage that he needs to get into contact with the operator or the service provider for adding a new service to his pager.

In EP 538 933 and EP 360 228 pagers are described where memory cards can be used. On these cards a credit counter is stored. This counter is decremented during operation of the pager until the credit is exhausted. Thereby, billing of costs is simplified for the provider, but the end user now must regularly recharge or replace the card. Also the problem of charging for the receipt of several services is not solved satisfactorily with a single card.

In U.S. Pat. No. 5,025,252 a pager is shown where the receipt of individual services can be blocked via radio. However, this involves considerable administrative expense for the network operator and is also an inflexible and therefore unsatisfactory solution for the end user.

DISCLOSURE OF THE INVENTION

It is therefore an object to provide a method or a receiver, respectively, of the type mentioned initially where a simple billing becomes possible for provider and user. This object is implemented by the independent claims.

As conventional devices, the receiver according to the invention comprises a receiver control unit, by means of which the digital signals to be processed and therefore being available for the user can be recognized, e.g. because of their address. In addition to this, however, a charge counter or charge determination unit is provided, which limits the choice or number, respectively, of the groups or services, respectively, to be processed. Hereby, processing is to be understood as the operations that are required for giving the user the benefit of the signal, i.e. especially the receipt, the decoding, the storage and the possibility of displaying. If at least one of these steps is missing, the signal is not processed.

Within his credit limit the user can choose, which services or groups, respectively, he wants to receive. He can also remove certain services from the selection and replace them by others, without needing to contact the network operator for this. Also, the user needs not be concerned for a renewal of his credit.

The charge counter can comprise a memory where a charge limit or credit, respectively, is stored and which is compared to the accrued charges. The memory can be modified directly at the device by means of suited manipulations or, preferably, also by radio by authorized persons.

Expensive services or groups, respectively, can also be counted several times, groups of free services may not be counted and groups of advertising services can be counted negatively (i.e. be credited as a bonus). It is also possible, by means of a timer, to determine for one or more groups the time during which this group is or are selected for processing. This time can be multiplied, if necessary, with a time charge for determining the accrued charge.

The invention is especially suited for pagers, but also for other devices such as mobile phones, mobile data, etc.

BRIEF DESCRIPTION OF THE DRAWINGS

Further advantages and applications of the invention are described in the following description with reference to the figures, wherein.

DESCRIPTION OF THE PREFERRED EMBODIMENTS

Figure 1:
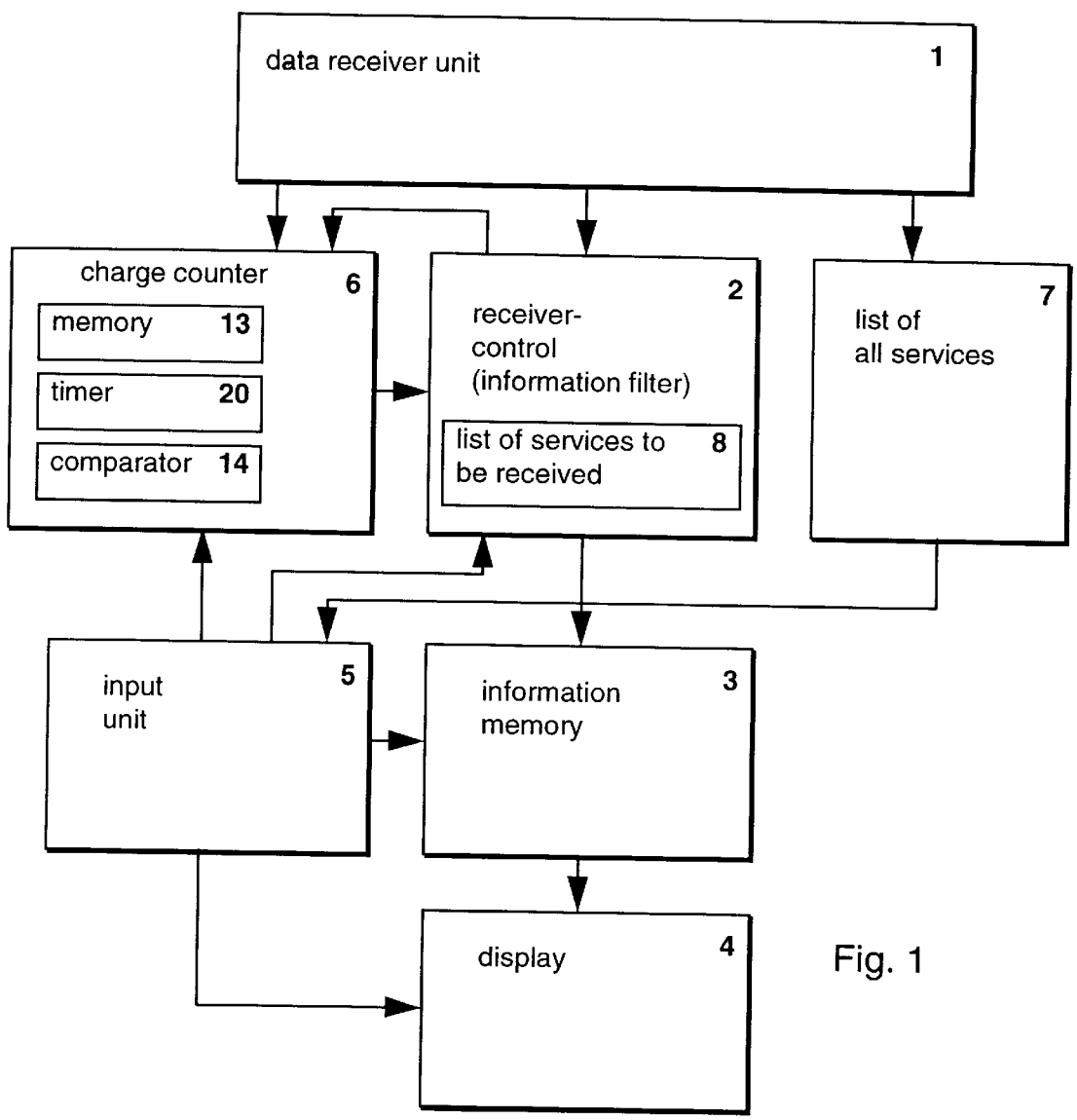
FIG. 1 a block diagram of a receiver according to the invention, and FIG. 2 the steps for determining the selectable or processable services, respectively.

In FIG. 1 the block diagram of a possible embodiment of the receiver being designed as a pager is shown. This pager receives data from a radio paging network of conventional kind, as it is e.g. described in EP-A-198 448, the disclosure of which is incorporated herein by reference. It comprises a data receiver unit 1 with radio receiver and demodulator of known kind, which receives and demodulates the radio signals of a network operator. The digital data received in this way are fed to a receiver control 2, which serves as an information filter. It selects the data that are to be stored. This happens e.g. based on address signals, which accompany each data package. All data packages that belong to the same group, i.e. to the same service, have the same address. For this purpose the receiver control comprises a list 8 of the services selected for receipt and processing, respectively, with their addresses. The receiver control 2 only allows processing of those signals that belong to one of the services stored in list 8.

The data to be processed are decoded and stored in an information memory 3. By means of an input unit 5 the user can determine, which of the data stored in information memory 3 are to be displayed on a display 4. The display 4 can e.g. be a numeric, alpha-numeric or graphical liquid crystal display.

The input unit 5 allows the applicant furthermore to change the list 8, i.e. to select further services or groups of signals, respectively, for receipt, to replace previously selected services with others or cancel them from list 8.

The receiver further comprises a charge determination unit or charge counter 6, respectively. This charge counter monitors which services or groups of data, respectively, are selected for processing, and determines a corresponding charge amount. If this amount exceeds a certain value, the selection of further services is prevented or the processing of already selected services is blocked. This is described in more detail below.

A list of the services that can be received is stored in a service or group memory 7, respectively, of the receiver. This list comprises the name of each service, information regarding the charges for receiving it, as well as the address attributed to the data packages of this service. This list can be updated regularly via radio to the latest state. By means of commands entered via the input unit 5 the names of the services and the charge information are transferred to the display 4. Now, the desired services can be selected and communicated to the receiver control 2.

Figure 2:
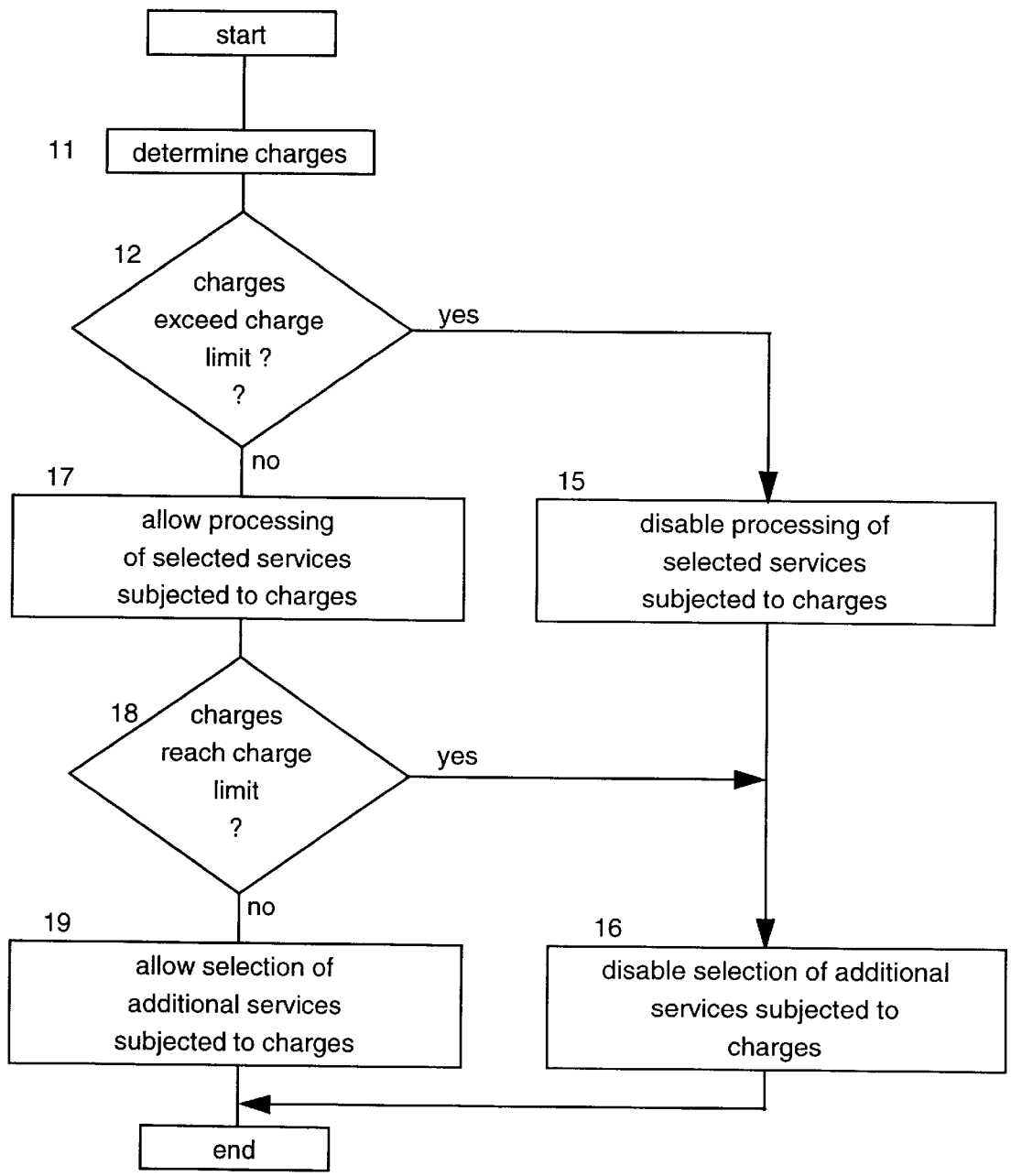

As mentioned, the purpose of the charge counter 6 is the determination of the charges for the services used by the user as a charge amount and, depending on the result of this determination, if the user is allowed to selected further services subject to charges or if, because of exceeding costs, the processing of already selected services subject to charges must be blocked. A possible process is shown in FIG. 2.

In a first step 11, the charges are determined which are accruing or have accrued, respectively, due to the present setup of the receiver and, possibly, due to its earlier use. These charges are compared to the charge limit. For this purpose, the charge counter is equipped with a memory 13, which contains the charge limit or the not yet used credit, respectively, as well as with a comparator 14, which can be implemented in hard- or software.

If the comparison in step 12 shows that the charge limit or credit has been exceeded, the processing of some or all of the selected services subject to charges must be disabled in step 15 and the selection of additional services subject to charges must be disabled in step 16.

If the charge limit or credit has not been exceeded, the processing of the currently selected services can be allowed in step 17. Then it is tested in step 18 if the charge limit has just been reached or if the credit is used up. In this case, the selection of further services subject to charges must be disabled in step 16.

If the charge limit has not been reached or the credit has not been used up, respectively, the selection of further services subject to charges can be allowed as well in step 19.

For determining the charges in step 11 there are several possibilities available:

In a most simple procedure, only the number of the services subject to charges that currently are selected for processing is determined. This number then corresponds to the accrued charge, independently of the duration during which the individual services have been selected. This method can be improved by counting especially expensive services several times. Other services (e.g. advertising services) can also not be counted or even be counted negatively, which indirectly leads to an increase of the charge limit. Generally, therefore, a charge value is attributed to each service. The charge value can be positive, negative or zero. The charge values are, as mentioned, stored in the list 7. For determining the accrued charge, the charge values of all selected services, i.e. of the services entered in list 8, are added. The charge determined in this way is then compared to the charge limit in step 12.

If the charge values can be both positive or negative, the charge counter 6 should be designed for adding signed charge values.

In another method for determining the charges, the sum of the products of those values and respective times for those services is evaluated. Also here, expensive services can be calculated several times or certain services may not be counted or be counted negatively. For determining the time, the charge counter is equipped with a timer 20. In an effective embodiment of this method, the number of currently selected services can be determined in regular time intervals (e.g. of some seconds or minutes) and be added to a counter or be subtracted from a credit. When the counter reaches the charge limit or the credit available goes to zero, respectively, the processing and/or selection of services subject to charges is disabled. In regular time intervals of e.g. one week or one month, the credit available is refilled back to its limit or the charge counter is reset to zero, e.g. by paying the agreed charge.

Since the costs for the received services are determined and monitored locally on the pager, the user can always decide himself which information he wants to receive. If he wants to add a new service, he does not need to contact the service or network provider as long as his selected-service accrued charge limit or credit, respectively, is sufficient for receiving this service. If his credit is not sufficient, he can switch off less interesting services. If he does not want to do without the services, he can agree on a higher limit with the operator. In this case, the charge limit or credit, respectively, is increased. This can occur locally on the pager, e.g. by entering a given code, or via radio, wherein in the latter case the value of the memory 13 is e.g. changed by a radio message to a given device address of the receiver. The credit or charge limit, respectively, can also be decreased again.

The charge counter can also dispose of further functions. It can e.g. recognize services the use of which is free during an initial trial phase. It can also enter bonuses for read advertisements, i.e. credit them to the credit or charge limit.

The invention is especially suited for pagers, i.e. portable radio call receivers for digital messages, but can also be used in other places where paid digital data are received by radio, such as e.g. in mobile phones with pager functions, in mobile data systems, etc.

While there are shown and described so far preferred embodiments, it must be emphasized that the invention is not limited thereto and can also be carried out differently within the scope of the following claims.

What is claimed is:

1. A method of receiving digital radio signals providing respective services, said method comprising the steps of:
   selecting a combination of services whose digital signals are to be processed by the receiver,
   determining a combined charge for said combination of selected services, and comparing said combined charge to a given charge limit and limiting selection of additional services if said combined charge exceeds said given charge limit.

2. The method of claim 1, further comprising the step of modifying said limit by a radio message.

3. In a receiver for digital radio signals that provide data for multiple services, at least two of said services being subject to respective predetermined charges, the improvement comprising:
   a receiver control unit for selecting services for processing by the receiver; and
   at least one charge counter for counting said selected services, comparing the count to a given limit and controlling the receiver control unit so that the processing of additional selected services by the receiver control unit is disabled when said count reaches said given limit.

4. The receiver of claim 3 further comprising a memory for storing said limit, wherein said limit can be modified by a radio message.

5. The receiver of claim 3 wherein said receiver control unit includes user input means for selectively adding or replacing a selected service with another service or canceling a selected service in response.

6. The receiver of claim 3 wherein said receiver control unit is designed for selectively canceling a selected service.

7. A receiver for digital radio signals providing respective services, at least some of said services being subject to charges, said receiver comprising:

selection means for selecting services to be processed by the receiver;

a receiver control unit for receiving and processing said selected services; and a charge determination unit for counting the selected services that are subject to charges and disabling selection of additional services subject to charges when the count of the selected services subject to charges exceeds a given charge limit.

8. A receiver for digital radio signals providing respective services having a predetermined service charge value attributed to each service, said receiver comprising:

selection means for selecting services to be processed, a receiver control unit for receiving and processing said selected services, and a charge determination unit for determining a sum of the service charge values for the selected services and for disabling selection of additional services when the value of the added service will cause said sum to exceed a given limit.

9. The receiver of claim 8 comprising a memory for storing a list of said selected services and the service charge attributed to each service.

10. The receiver of claim 9 wherein said list stored in said memory can be modified by a radio message.

11. The receiver of claim 8, wherein said charge determination unit is designed such that at least a first part of said service charges can be zero.

12. The receiver of claim 8, wherein said charge determination unit is designed such that at least a second part of said service charges can be positive and that a third part of said service charges can be negative.

* * * * *